United States Patent Office 3,804,815
Patented Apr. 16, 1974

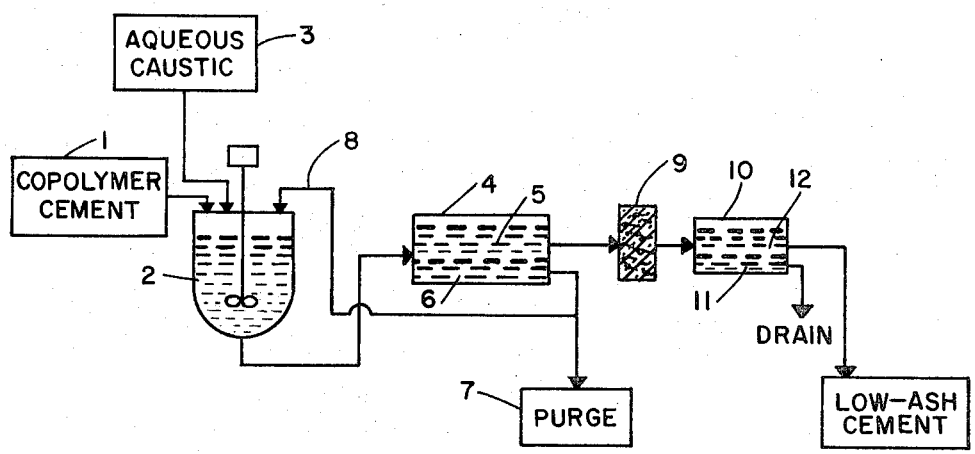

3,804,815
PROCESS FOR REMOVAL OF CATALYST FROM AMORPHOUS COPOLYMERS
Larry Plonsker, Bloomfield Hills, Mich., assignor to Ethyl Corporation, Richmond, Va.
Filed April 5, 1972, Ser. No. 241,182
Int. Cl. C08f 1/88
U.S. Cl. 260—80.78
8 Claims

ABSTRACT OF THE DISCLOSURE

A process is described for preparing an amorphous ethylene-propylene copolymer optionally containing a diene such as 1,4-hexadiene, 1,5-cyclooctadiene, dicyclopentadiene, and the like. The olefins are polymerized in the presence of a catalyst formed by mixing a vanadium compound such as a vanadium halide, oxyhalide, or alkoxide with an organo-aluminum compound such as a trialkyl aluminum, alkyl aluminum hydride, or alkyl aluminum halide. A low ash product is recovered by washing the resultant copolymer solution with aqueous caustic, separating the spent aqueous caustic solution, passing the filtered copolymer solution through a filter and removing the aqueous phase which separates from the filtered product.

BACKGROUND

Processes for preparing substantially amorphous copolymers of ethylene and propylene optionally containing a diene to form terpolymer are known. Suitable processes are described by Lukach et al., U.S. 3,153,023; Ziegler et al., U.S. 3,113,115; Vandenberg, U.S. 3,051,690; Jacobson et al., U.S. 3,551,336; Biswell et al., U.S. 3,598,738; and Sweeney et al., U.S. 3,522,180. In these processes a mixture of ethylene and propylene and optionally a diene is added to an inert solvent containing a catalyst formed by mixing a vanadium compound with an organoaluminum compound. The catalyst is substantially soluble, which gives the desired amorphous rubbery products but unfortunately results in a product containing a substantial amount of vanadium and aluminum ash. This ash results from catalyst carryover and is very difficult to remove. The present process describes an improvement in the known polymerization procedures whereby a low ash product can be obtained.

BRIEF DESCRIPTION OF THE DRAWING

FIG. 1 is a schematic diagram of the recovery procedure of this invention.

SUMMARY

The present invention is an improvement in the known process for producing ethylene-propylene copolymers or ethylene-propylene-diene terpolymers by reacting ethylene and propylene and optionally a diene in an inert solvent in the presence of a catalyst formed by mixing a vanadium compound with an organo-aluminum compound. In the improvement the vanadium and aluminum ash in the final product is reduced by washing the polymer solution with aqueous caustic, passing the washed hazy product through a filter, and removing the aqueous phase which separates as a result of the filter treatment, leaving a bright, clear, low ash polymer cement.

DESCRIPTION OF THE PREFERRED EMBODIMENTS

A preferred embodiment of this invention is an improvement in a process for producing amorphous ethylene-propylene copolymers or ethylene-propylene-diene terpolymers. The basic process comprises adding ethylene and propylene and optionally a diene to a liquid hydrocarbon solvent containing a catalytic amount of a reaction product formed by mixing a vanadium compound selected from vanadium halides, oxyhalides, and alkoxides with an organoaluminum compound selected from trialkyl aluminums, alkyl aluminum hydrides, and alkyl aluminum halides, and recovering the resultant copolymer. In the improvement of this invention the recovery step is conducted by:

(a) mixing the solution of said copolymer or terpolymer containing the catalyst residue with an aqueous caustic solution,
(b) separating the spent aqueous caustic from the washed copolymer or terpolymer,
(c) passing said washed copolymer or terpolymer solution through a filter, and
(d) removing the aqueous phase which separates from the filtered copolymer solution as a result of the filtration treatment.

Suitable processes for preparing substantially amorphous ethylene-propylene copolymers or ethylene-propylene-diene terpolymers are described in detail in U.S. Pats. 3,153,023; 3,113,115; 3,051,690; 3,551,336; 3,598,-738; and 3,522,180, which are incorporated herein by reference as if fully set forth. In general, these procedures comprise adding ethylene and propylene and optionally a diene to an inert solvent containing the reaction product formed by mixing a vanadium compound with an organoaluminum compound at a temperature in the range of from about 0 to about 150° C. Suitable vanadium compounds include vanadium halide, oxyhalides and alkoxides. Examples of these are vanadium trichloride, vanadium tribromide, vanadium oxychloride, vanadium oxybromide, tri-n-propyl vanadate, tri-n-butyl vanadate, tri-tert-butyl vanadate, diethylchloro vanadate, vanadium oxy tri-acetylacetonate, and the like.

The organoaluminum compounds include the trialkyl aluminums, alkyl aluminum hydrides, and alkyl aluminum halides such as alkyl aluminum dihalides, dialkyl aluminum halides, and alkyl aluminum sesquihalides. Examples of these are triethyl aluminum, tri-n-propyl aluminum, tri-n-butyl aluminum, triisobutyl aluminum, diethyl aluminum hydride, diiso-butyl aluminum hydride, ethyl aluminum dichloride, ethyl aluminum dibromide, n-propyl aluminum dichloride, n-butyl aluminum dichloride, diethyl aluminum chloride, diethyl aluminum bromide, di-n-propyl aluminum chloride, di-n-butyl aluminum bromide, diisobutyl aluminum bromide, diiso-propyl aluminum chloride, methyl aluminum sesquichloride, methyl aluminum sesquibromide, ethyl aluminum sesquichloride, ethyl aluminum sesquibromide, and the like.

The amount of organoaluminum compound should be sufficient to reduce part of the vanadium compound to a valence less than 3. Generally, the molar ratio of organoaluminum compound to vanadium compound will range from abou 0.2–20:1. The amount of catalyst used should be a catalytic amount—that is, the amount required to catalyze the polymerization at a useful rate. In general, from about 0.1–100 millimols of vanadium compound per liter of reaction mixture is adequate.

The solvent used can be any liquid in which the monomers will dissolve and which is substantially inert to the reactant present. Such solvents include aromatic and aliphatic hydrocarbons and halohydrocarbons. The preferred solvents are the aliphatic and cycloaliphatic hydrocarbons such as pentane, hexane, heptane, cyclohexane, and the like.

The amount of solvent should be adequate to provide a polymer solution of cement that can be readily handled, since the polymer tends to thicken the solvent. In general, there should be sufficient solvent such that the resultant cement contains from about 2 to 20 weight percent polymer and, more preferably, from about 3 to 10 weight percent polymer.

The polymerization is operable over a wide temperature range. A useful range is from 0–150° C., and a preferred range is from about 20–100° C.

The ratio of ethylene to propylene should be adjusted to give the desired ratio of ethylene to propylene units in the copolymer. Since ethylene is more reactive, the ratio of ethylene to propylene in the olefins fed to the system should be less than the ratio of ethylene to propylene units desired in the product. Useful feed streams are those comprising from 10–90 mole percent ethylene and 90–10 mole percent propylene. The ethylene and propylene may be premixed or added separately.

It is sometimes desired to include a diene in the polymerization system to form a terpolymer having improved vulcanization properties. The amount of diene can vary over a wide range. A useful terpolymer is obtained by using from about 1 to about 10 mole percent of diene.

Useful dienes include all those customarily used to prepare ethylene-propylene-diene terpolymer rubbers such as 1,5-cyclooctadiene, 1,4-hexadiene, dicyclopentadiene, methylene norbornene, 5-vinyl-2-norbornene, 1,5-cyclodecadiene, 2,4-dimethyl-2,7-octadiene, 3(2-methyl-1-propiono)cyclopentene, 1,5-octadecadiene, 1,4-pentadiene, 1,5-hexadiene, 2-methyl-1,5-hexadiene, 1,6-heptadiene, 1,7-octadiene, and the like.

Polymerization is quite rapid under the conditions described and is generally complete within 30 minutes to 4 hours. The polymerization can be conducted as a batch or a continuous operation. A continuous procedure is preferred wherein the reactants are continuously fed to a polymerization vessel at a metered rate such that the desired reactant ratios are maintained. Reaction mixture is withdrawn from the polymerization vessel at a rate sufficient to provide adequate residence time in the vessel to obtain the desired degree of polymerization. The reaction mixture withdrawn is then ready for the purification treatment of the present invention.

The resultant polymer solution is quite viscous and contains the catalyst. In most cases it is highly desirable to remove substantially all the catalyst residue in order to obtain a low ash product. It has been attempted to wash out the aluminum and vanadium constituents using aqueous caustic. This results in a hazy product. When the solvent and residual moisture is stripped from this hazy product the ash level is unacceptably high. According to the present invention, acceptable ash levels are achieved by simply passing the caustic wash copolymer solution through a filter and then removing the aqueous phase that separates as a result of this treatment. This secondary separation of an aqueous phase accounts for the very low ash content of the product of this solution.

Suitable filters include those commonly used in the chemical industry such as polypropylene, woven nylon fabric, random and woven glass fiber filters, jute, fritted glass filters, dynel, and also beds of filter aids such as diatomaceous earth, Celite, asbestos, and the like. Preferred filter materials are the cellulosics such as paper, cotton, rayon, cellulose acetate, and the like. A cotton filter, either woven or wound filament, is most preferred.

The porosity of the filter is not critical. It should be porous enough to give an adequate filter rate but not so porous that it results in inadequate separation of the residual aqueous phase. It depends somewhat on the type filter employed and is readily determined experimentally without undue effort. When using cotton filament wound about a central core a 1–5 micron pore size is satisfactory. However, it is not intended to apply such limitation to the invention but only to demonstrate a best mode of carrying out the invention.

The aqueous phase which separates after the filtration treatment can be easily removed by allowing it to settle and then draining it off through an outlet in the bottom of a settling vessel.

The recovery sequence is shown in FIG. 1. Copolymer cement 1 (about 5 percent polymer), from a known polymerization process, which contains the vanadium and aluminum catalyst residue is fed into a vigorously stirred wash vessel 2 together with a 5–40 weight percent aqueous caustic solution (25 percent in this example). After sufficient time to provide thorough mixing, the mixture is conducted to a settling tank 4 in which it forms an organic phase 5 and a lower aqueous phase 6. The aqueous phase 6 is continuously removed, part being drained to purge 7 and most being recycled 8 to the wash vessel.

The upper organic phase 5 is conducted through filter 9 to second settling tank 10 wherein a secondary water separation occurs due to the effect of the filter treatment. Aqueous phase 11 is drained and the resultant low ash cement 12 is conducted to storage from which it may be subject to further treatments well known in the art such as solvent stripping, oil dilution to form viscosity index improving additives for lubricating oils, compounding and vulcanization to form rubber products, and the like.

The manner by which the improved process is conducted is illustrated by the following working examples.

The manner by which the improved process is conducted is illustrated by the following working examples.

EXAMPLE 1

In a polymerization vessel place 500 ml. of tetrachloro ethylene, cool to 0° C., and saturate the solvent by introducing ethylene, propylene, nitrogen and hydrogen at flow rates of 2.0, 1.5, 0.5 and 0.1 liters per minute, respectively. Add 2.9 ml. (0.05 mole) of 1,4-hexadiene, and 5 ml. of 1.0 molar solution of diisobutyl aluminum chloride in tetrachloroethylene. To this add 5 ml. of a 0.10 molar solution of vanadium tris-acetylacetonate in benzene. Stir the mixture at 0° C. for 20 minutes and then add 10 milliliters of a 1 percent solution of 4,4'-methylene-bis(2,6-di-tert-butylphenol) in isopropanol to deactivate the catalyst. Slowly pour the solution into a wash vessl containing 500 ml. of 20 percent aqueous sodium hydroxide. Stir this mixture vigorously for 5 minutes and then transfer to a settling vessel. The organic layer settles to the bottom and is drained through a drain valve. Transfer the organic phase to a second wash vessel and wash with 500 ml. of 5 percent aqueous sodium hydroxide. Again drain the lower organic layer and pass it through a paper filter. Allow the filtrate to again settle and drain the clear organic phase from the small upper water layer. Remove the solvent from the organic phase by slowly injecting it together with steam into boiling water, thus codistilling water and solvent. The rubber crumb is recovered by filtration and vacuum dried. It is useful for preparing rubber goods.

EXAMPLE 2

In a polymerization vessel place 2 liters of cyclohexane. Cool to 4° C. and saturate with a gas stream containing ethylene, propylene and hydrogen. The stream contains 4.6 mole percent hydrogen and the molar ratio of propylene:ethylene is 0.95:1.0. Add 40 ml. of a 20 weight percent heptane solution of diethyl aluminum chloride and 3 ml. of a 20 weight percent heptane solution of tri-n-butyl vanadate. Continue injecting the above gas stream at a rate of 1 liter per minute for 10 minutes while maintaining the temperature at 4–10° C. Discontinue gas injection and transfer the mixture to a wash vessel containing 1 liter of 25 weight percent of aqueous sodium hydroxide. Stir vigorously for 5 minutes and then transfer to a settling vessel. Drain the lower caustic phase and pass the remaining hazy organic phase through a cotton fabric filter (5 micron pore size). Hold the filtrate in a settling vessel, during which period a second water separation occurs. Drain this secondary water, leaving a clear organic phase. Remove solvent from the organic phase under vacuum, leaving an ethylene-propylene copolymer. An additive concentrate can be prepared from this copolymer by cutting it in small pieces and placing 12 grams of the copolymer in 90 grams of a paraffinic solvent-refined neutral oil. This mixture is milled for 4 minutes, giving a clear solution. This additive concentrate is useful as a viscosity improver for lubricating oils. Good results are obtained by adding sufficient concentrate to a lubricating oil to provide about 3 weight percent copolymer in the finished lubricating oil.

Comparative tests were carried out to demonstrate the benefits resulting from the filter treatment. Several preparations of $C_2$–$C_3$ copolymers were prepared following a procedure similar to that in Example 2 except on a continuous basis. The product was in each case washed with aqueous caustic to remove catalyst residue. One part of each preparation was subjected to filter treatment using a wound cotton filament cylindrical filter element (5–20 micron porosity). Ash content of each product was determined. Results were as follows.

| Run | Ash, wt. percent | |
|---|---|---|
| | Without filter treatment | With filter treatment |
| 3 | .0052 | .0001 |
| 4 | .0010 | .0001 |
| 5 | .0162 | .0060 |
| 6 | .0069 | .0008 |

The results show the great reduction in ash on comparable products as a result of the filter treatment of the washed polymer solution. This reduction in ash is due to the secondary water separation caused by the filtration and not due to removal of solids by the filter because at this stage the catalyst residue is dissolved.

I claim:

1. In a process for producing an amorphous ethylene-propylene α-olefin copolymer or terpolymer, said process comprising adding ethylene and propylene and optionally a diene to an inert solvent containing a catalytic amount of a reaction product formed by mixing a vanadium compound selected from vanadium halides, oxyhalides, and alkoxides with an organoaluminum compound selected from trialkyl aluminums, alkyl aluminum hydrides and alkyl aluminum halides and recovering the resultant copolymer or terpolymer, the improvement wherein said recovering comprises:
   (a) mixing the reaction solution of said copolymer or terpolymer containing the catalyst residue with an aqueous caustic solution,
   (b) separating the spent aqueous caustic from the washed copolymer or terpolymer solution,
   (c) passing said washed solution through a filter, and
   (d) removing the aqueous phase which separates from the filtered copolymer or terpolymer solution.

2. The process of claim 1 wherein said filter is a cellulosic filter.

3. The process of claim 2 wherein said cellulosic filter is a cotton fabric filter.

4. The process of claim 1 wherein said organoaluminum compound is an alkyl aluminum halide.

5. The process of claim 4 wherein said alkyl aluminum halide is a dialkyl aluminum chloride.

6. The process of claim 5 wherein said vanadium compound is a vanadium alkoxide.

7. The process of claim 6 wherein said filter is a cellulosic filter.

8. The process of claim 7 wherein said cellulosic filter is a cotton fabric filter.

References Cited

FOREIGN PATENTS 617,460   2/1961   Italy.

OTHER REFERENCES

Encyclopedia of Polymer Science and Technology, vol. 6, p. 348, 1965, Interscience Publ. Co., New York, "Ethylene Polymers."

U.S. Cl. X.R.
260—88.2 C, 94.9 F